UNITED STATES PATENT OFFICE.

RICHARD I. L. WITTY, OF LOWELL, MASSACHUSETTS.

IMPROVEMENT IN THE MANUFACTURE OF GUNPOWDER.

Specification forming part of Letters Patent No. 669, dated April 2, 1838.

*To all whom it may concern:*

Be it known that I, RICHD. I. L. WITTY, civil engineer, of the city of Lowell, State of Massachusetts, have discovered a new and powerful Composition for the Manufacture of Gunpowder; and I do hereby declare that the following is a full and exact description thereof.

My discovery consists in using a material capable of yielding a large quantity of carbureted hydrogen or inflammable gas—namely, bituminous coal. The coal is to be highly comminuted with certain proportions of sulphur and nitrate of potash. These three substances are taken in a powdered state and then mixed together; but since these ingredients vary in quantity or otherwise, they will require their definite proportions to be adapted to each other. Here follows a formula which I have used and found to answer well—viz: bituminous coal, twenty-six pounds or parts; nitrate of potash, one hundred and fifty-six pounds or parts; sulphur, thirty-three and one-half pounds or parts; and in order to make the gunpowder the above ingredients are to be intimately mixed together, as must be the case in preparing gunpowder from any materials, and then the combination may undergo the same process as is at present practiced with common gunpowder—viz., in the pressing, graining, glazing, and drying.

What I claim as my discovery is—

Making use of bituminous coal in the place of charcoal to form gunpowder, with the other two ingredients at present used—viz., sulphur and niter; and for the use of these two last-named ingredients I do not claim any exclusive right.

RICHD. I. L. WITTY.

Witnesses:
 N. W. RYAN,
 W. DUESBURY.